(12) United States Patent
Saito et al.

(10) Patent No.: US 9,827,617 B2
(45) Date of Patent: Nov. 28, 2017

(54) DRILL AND METHOD OF MANUFACTURING DRILL

(71) Applicant: FUJI JUKOGYO KABUSHIKI KAISHA, Tokyo (JP)

(72) Inventors: Manabu Saito, Tokyo (JP); Tatsuo Nakahata, Tokyo (JP); Hideharu Takahashi, Tokyo (JP); Masao Watanabe, Tokyo (JP); Toshio Nishino, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 14/713,432

(22) Filed: May 15, 2015

(65) Prior Publication Data
US 2015/0336182 A1    Nov. 26, 2015

(30) Foreign Application Priority Data
May 22, 2014    (JP) .................................. 2014-106593

(51) Int. Cl.
  *B23B 51/02*    (2006.01)
  *B23B 51/00*    (2006.01)
  (Continued)

(52) U.S. Cl.
  CPC .............. *B23B 51/00* (2013.01); *B23P 15/28* (2013.01); *B24B 3/242* (2013.01);
  (Continued)

(58) Field of Classification Search
  CPC ... B23B 51/00; B23B 51/02; B23B 2251/082; B23B 2251/085; B23B 2251/14;
  (Continued)

(56) References Cited

U.S. PATENT DOCUMENTS 571,253 A * 11/1896 Wesselmann et al. ..................... B23B 51/048
408/223
3,443,459 A    5/1969 Mackey et al.
(Continued)

FOREIGN PATENT DOCUMENTS

DE    20 2009 012 569    1/2010
EP    1 215 001    6/2002
(Continued)

OTHER PUBLICATIONS

Japanese Final Rejection issued Apr. 26, 2016, in Patent Application No. 2014-106593 (in Japanese with English Translation) 8 pages.
(Continued)

*Primary Examiner* — Sunil K Singh
*Assistant Examiner* — Alan Snyder
(74) *Attorney, Agent, or Firm* — Smith, Gambrell & Russell, LLP

(57) ABSTRACT

According to one implementation, a drill has at least one cutting edge. A projected shape of a passing area of a ridgeline of the at least one cutting edge when the at least one cutting edge is rotated around a tool axis becomes a line-symmetric and discontinuous line along a parabola, two parabolas, an ellipse or two ellipses. The projected shape is drawn on a projection plane parallel to the tool axis.

17 Claims, 4 Drawing Sheets

(51) Int. Cl.
*B23P 15/28* (2006.01)
*B24B 3/24* (2006.01)

(52) U.S. Cl.
CPC ....... *B23B 2222/56* (2013.01); *B23B 2226/27* (2013.01); *B23B 2226/275* (2013.01); *B23B 2251/08* (2013.01); *B23B 2251/082* (2013.01); *B23B 2251/085* (2013.01); *B23B 2251/14* (2013.01); *B23B 2251/18* (2013.01); *B23B 2251/201* (2013.01); *B23B 2251/202* (2013.01); *B23B 2251/204* (2013.01); *B23B 2251/205* (2013.01); *B23B 2251/207* (2013.01); *B23B 2251/248* (2013.01); *Y10T 408/89* (2015.01)

(58) Field of Classification Search
CPC .......... B23B 2251/18; B23B 2251/208; B23B 2251/248; B23B 2251/08; B23B 51/009
See application file for complete search history.

(56) References Cited

U.S. PATENT DOCUMENTS

| | | | | |
|---|---|---|---|---|
| 4,383,785 | A * | 5/1983 | Rice | B23B 51/02 |
| | | | | 125/20 |
| 4,455,786 | A | 6/1984 | Maysilles | |
| 7,665,935 | B1 * | 2/2010 | Garrick | B23B 35/005 |
| | | | | 408/227 |
| 2010/0158627 | A1 * | 6/2010 | Mir | B23B 51/02 |
| | | | | 408/230 |
| 2010/0166517 | A1 | 7/2010 | Saito et al. | |
| 2012/0263548 | A1 * | 10/2012 | Harris | B23B 51/00 |
| | | | | 408/224 |
| 2013/0039709 | A1 * | 2/2013 | Goh | B23B 51/02 |
| | | | | 408/1 R |

FOREIGN PATENT DOCUMENTS

| | | |
|---|---|---|
| EP | 2 298 476 | 3/2011 |
| JP | H05-069214 | 3/1993 |
| JP | H06-75612 | 10/1994 |
| JP | H10-309697 | 11/1998 |
| JP | 2008-036759 | 2/2008 |
| JP | 2010-155289 | 7/2010 |
| JP | 2010-284783 | 12/2010 |
| JP | 2013-252588 | 12/2013 |
| JP | 2014-012317 | 1/2014 |
| RU | 95102641 | 11/1996 |
| WO | 2010/086988 | 8/2010 |
| WO | 2010/111994 | 10/2010 |

OTHER PUBLICATIONS

Extended European search report issued Oct. 7, 2015, in Patent Application No. 15 168 663.1 (8 pages).
First Japanese Office Action dated Apr. 18, 2017, in Japanese Patent Application No, JP 2016-143816 (with English 'Translation 13 pages).
Japanese Office Action dated Jul. 18, 2017, in Japanese Patent Application No. JP 2014-106593 (5 pages).
Written Argument filed Sep. 14, 2017 relative to Japanese Patent Application No. JP 2014-106593 (with English Translation 20 pages).
Written Amendment filed Sep. 14, 2017 relative to Japanese Patent Application No. JP 2014-106593 (with English Translation 8 pages).

* cited by examiner

DRILL AND METHOD OF MANUFACTURING DRILL

CROSS REFERENCES TO RELATED APPLICATIONS

This application is based upon and claims the benefit of priority from Japanese Patent Application No. 2014-106593, filed on May 22, 2014; the entire contents of which are incorporated herein by reference.

FIELD

Implementations described herein relate generally to a drill and a method of manufacturing a drill.

BACKGROUND

Conventionally, aiming to drill not only metals but also composite materials, such as GFRP (glass fiber reinforced plastics) and CFRP (carbon fiber reinforced plastics), with a high precision, a variety of polygonal drills are proposed (for example, refer to Japanese Patent Application Publication No. 2013-252588, Japanese Utility Model Registration Application Publication No. H06-75612 and Japanese Patent Application Publication No. 2010-284783).

An object of the present invention is to provide a drill, which can drill a variety of workpieces, such as metals and composite materials, under more preferable conditions, and a method of manufacturing such a drill.

SUMMARY OF THE INVENTION

In general, according to one implementation, a drill has at least one cutting edge. A projected shape of a passing area of a ridgeline of the at least one cutting edge when the at least one cutting edge is rotated around a tool axis becomes a line-symmetric and discontinuous line along a parabola, two parabolas, an ellipse or two ellipses. The projected shape is drawn on a projection plane parallel to the tool axis.

Further, according to another implementation, a drill has at least three different point angles and at least one cutting edge of which positions of both ends of each of ridgelines forming the point angles are on a parabola or plural parabolas.

Further, according to another implementation, a drill has at least four different point angles and at least one cutting edge of which ridgelines forming the point angles are tangent to a parabola or plural parabolas.

Further, according to another implementation, a method of manufacturing a drill includes: setting a material of a drill; and forming at least one cutting edge using the material. A projected shape of a passing area of a ridgeline of the at least one cutting edge when the at least one cutting edge is rotated around a tool axis becomes a line-symmetric and discontinuous line along a parabola, two parabolas, an ellipse or two ellipses. The projected shape is drawn on a projection plane parallel to the tool axis.

DETAILED DESCRIPTION

A drill and a method of manufacturing a drill according to implementations of the present invention will be described with reference to the accompanying drawings.

(First Implementation)

Figure 1:
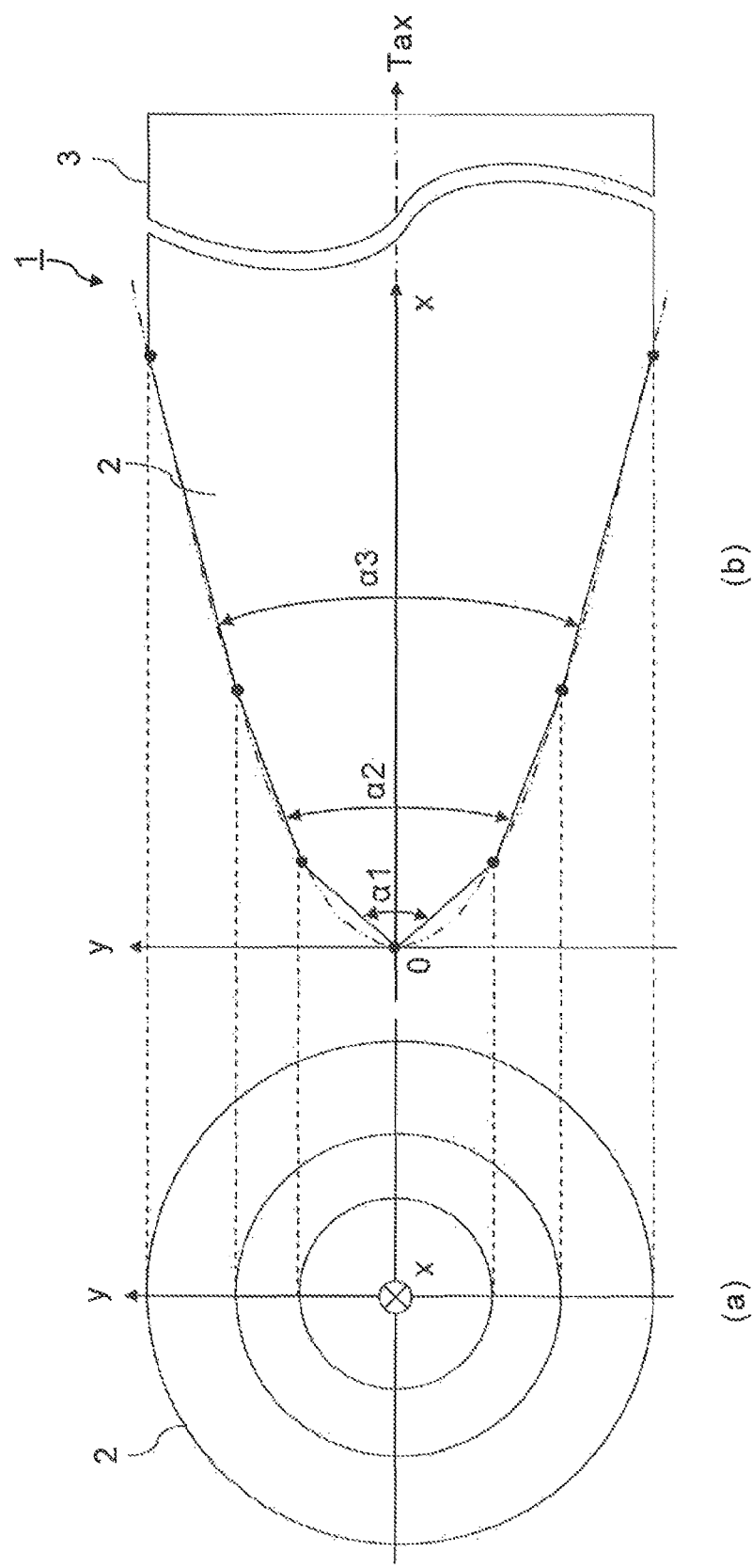
FIG. 1 shows a shape of a drill according to the first implementation of the present invention.

FIG. 1 shows a shape of a drill according to the first implementation of the present invention.

A drill 1 has cutting edges 2 and a shank 3 for rotating the cutting edges 2. The number of the cutting edges 2 is arbitrary. Specifically, the drill 1 can be a one flute drill, a two flute drill, a three flute drill, a four flute drill, a five flute drill or a drill having not less than six flutes. It is preferable to configure a solid type drill 1 by integrating the cutting edges 2 with the shank 3 from a viewpoint of improving mechanical characteristics, such as rigidity, abrasion resistance and toughness. Alternatively, the drill 1 may have a structure in which interchangeable chip type cutting edges 2 are attached to the shank 3.

(a) of FIG. 1 is a projected view of a passing area of ridgelines of the cutting edges 2, on a projection plane perpendicular to a tool axis Tax when the cutting edges 2 are rotated around the tool axis Tax. Meanwhile, (b) of FIG. 1 is a projected view of the passing area of the ridgelines of the cutting edges 2, on a projection plane parallel to the tool axis Tax when the cutting edges 2 are rotated around the tool axis Tax.

Therefore, when the number of the cutting edges 2 is even, (b) of FIG. 1 is a cross-sectional view of the drill 1 showing a shape of the cutting edges 2. Meanwhile, when the number of the cutting edges 2 is odd, (b) of FIG. 1 is a cross-sectional view of the drill 1 whose sectioning direction changes at the tool axis Tax along the cutting edges 2.

As shown in FIG. 1, the drill 1 is a polygonal drill which has plural point angles. In FIG. 1, the drill 1 having a three step angle consisting of three different point angles α1, α2 and α3 has been exemplified. Therefore, as shown in (b) of FIG. 1, the cutting edge 2 has a shape such that, when a passing area of a ridgeline of a cutting edge 2 is projected on a projection plane parallel to the tool axis Tax, a line-symmetric polygonal line connecting linear line segments discontinuously is drawn as a discontinuous line on the projection plane.

Alternatively, a shape of the cutting edges 2 on the projection plane may also be a shape connecting continuous curves instead of linear line segments. In that case, the cutting edge 2 has a shape such that, when a passing area of a ridgeline of a cutting edge 2 is projected on a projection plane parallel to the tool axis Tax, a line-symmetric curve connecting continuous curves discontinuously is drawn as a discontinuous line on the projection plane.

Furthermore, the cutting edge 2 of the drill 1 has a shape such that, when a passing area of a ridgeline of a cutting edge 2 is projected on a projection plane parallel to the tool axis Tax, a line-symmetric and discontinuous line along a single or two parabolas or ellipse is drawn on the projection plane. In the example shown in (b) of FIG. 1, a line-symmetric and discontinuous polygonal line along a single parabola has been drawn on the projection plane.

When the cutting edges 2 are designed by the designing method as described above, volumes of a workpiece which are cut by the ridgelines of the cutting edges 2 respectively can be approximately constant among the ridgelines.

Figure 2:
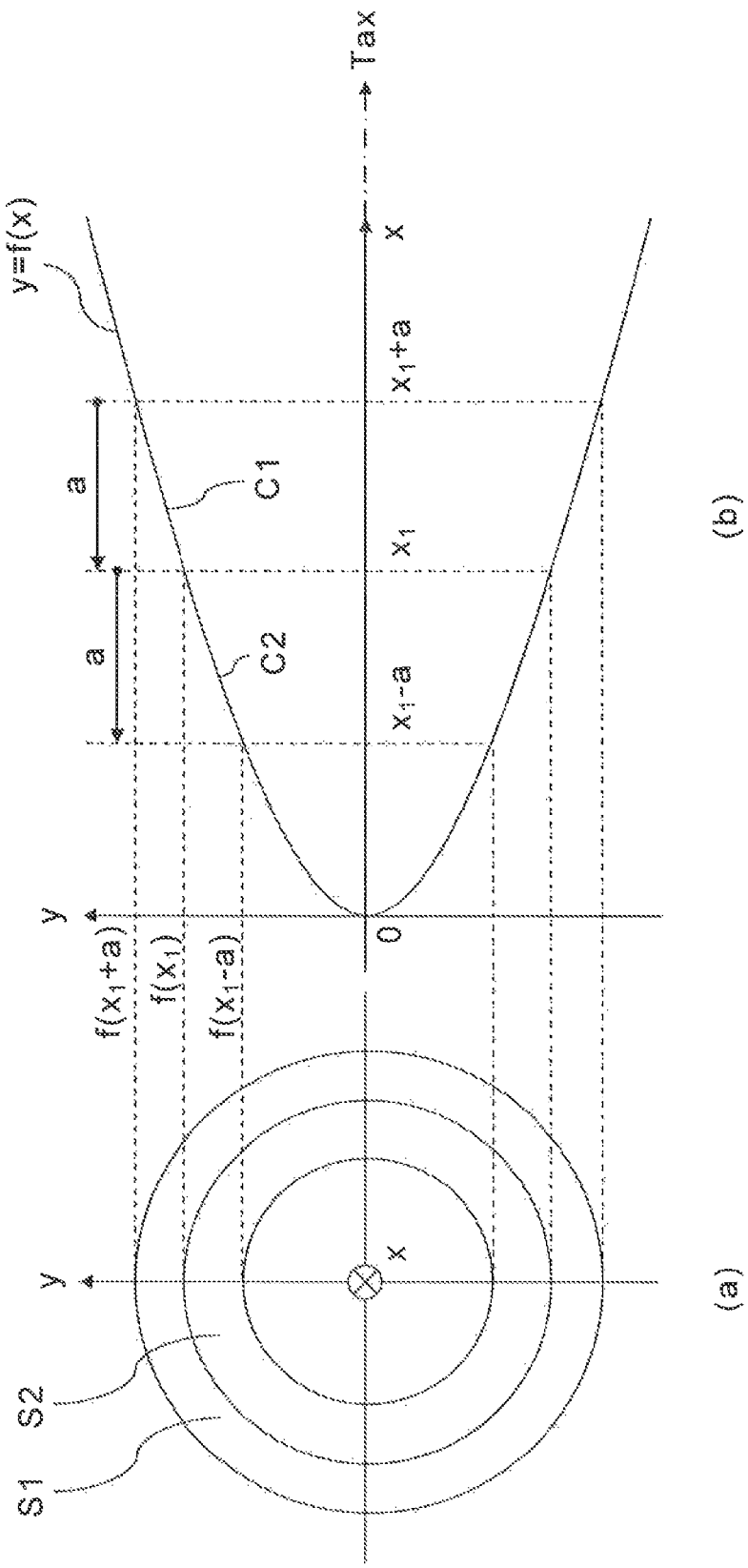
FIG. 2 is a view for explaining a method of designing each cutting edge of the drill shown in FIG. 1.

FIG. 2 is a view for explaining a method of designing each cutting edge 2 of the drill 1 shown in FIG. 1.

(a) of FIG. 2 shows a projection plane, perpendicular to the tool axis Tax, of the passing area of the ridgelines of the cutting edges 2 when the cutting edges 2 are rotated around the tool axis Tax. Meanwhile, (b) of FIG. 2 shows a projection plane, parallel to the tool axis Tax, of the passing area of the ridgelines of the cutting edges 2 when the cutting edges 2 are rotated around the tool axis Tax.

When an xy-coordinate system is defined so that the tool axis Tax direction is the x-axis direction and the direction perpendicular to the tool axis Tax on a projection plane involving the tool axis Tax is the y-axis direction as shown in (b) of FIG. 2, an expression of a curve along the ridgeline of each cutting edge 2 of the drill 1 can be expressed by a function as y=f(x). On the condition that the ridgeline of each cutting edge 2 of the drill 1 is a curve expressed by y=f(x), volumes V1 and V2 of a workpiece cut by adjacent sections C1 and C2 of each ridgeline whose lengths in the tool axis Tax direction are a feeding amount "a" can be calculated by expression (1-1) and expression (1-2), respectively.

$$V1=aS1=a\{\pi f(x_1+a)^2-\pi f(x_1)^2\}=a\pi\{f(x_1+a)^2-f(x_1)^2\} \quad (1\text{-}1)$$

$$V2=aS2=a\{\pi f(x_1)^2-\pi f(x_1-a)^2\}=a\pi\{f(x_1)^2-f(x_1-a)^2\} \quad (1\text{-}2)$$

wherein, S1 and S2 in expression (1-1) and expression (1-2) show areas of regions shown in (a) of FIG. 2, i.e., respective areas of two dimensional regions obtained by projecting the passing areas of the partial ridgelines C1 and C2, on a projection plane perpendicular to the tool axis Tax, when each cutting edge 2 is rotated around the tool axis Tax. Furthermore, $x_1$ shows an x-coordinate at the boundary point of the partial ridgelines C1 and C2.

Therefore, a curve y=f(x) where the volume V1 of the workpiece cut by the partial ridgeline C1 and the volume V2 of the workpiece cut by the partial ridgeline C2 become equal to each other is an ideal curve. Then, rewriting an expression, showing that the right sides of expression (1-1) and expression (1-2) are equal, derives expression (2).

$$2f(x_1)^2=f(x_1+a)^2+f(x_1-a)^2 \quad (2)$$

A function which satisfies conditions of expression (2) is a parabola shown by expression (3).

$$f(x)=bx^{1/2} \quad (3)$$

wherein b is an arbitrary constant. Note that, also in case of solving an equation under a condition that the areas S1 and S2 of the regions shown in (a) of FIG. 2 are equal to each other, a parabola is similarly obtained as the solution.

Therefore, when the cutting edge 2 is designed so that ridgeline is on a parabola expressed by expression (3), a volume of the workpiece cut by the ridgeline per unit length in the tool axis Tax direction can be constant. However, producing the cutting edge 2 having a ridgeline on a parabola whose curvature changes continuously leads to an increase in production costs.

Thus, it is preferable to design the cutting edge 2 whose shape of the ridgeline is discontinuous line segments which approximate a parabola. Note that, a part of an ellipse is occasionally able to be considered as a curve locally similar to a parabola. Therefore, a form of the cutting edge 2 may also be designed so that a line-symmetric and discontinuous line which is approximately along an ellipse instead of a parabola is drawn on a projection plane. Also in that case, designing the cutting edge 2 having a ridgeline whose form is discontinuous line segments which approximate an ellipse leads to reducing production costs of the cutting edge 2. That is, it is preferable to design each cutting edge 2 of a polygonal drill so that a shape of each ridgeline is a polygonal line or a discontinuous curve derived by a polygonal approximation of a parabola or an ellipse.

When the cutting edge 2 is designed to have a shape connecting linear line segments discontinuously, for example, the shape of the cutting edge 2 can be designed so that a line-symmetric polygonal line discontinuously connecting at least six linear line segments of which respective positions of the both ends are on a parabola is drawn on a projection plane as a discontinuous line as exemplified in FIG. 1. Thereby, the cutting edge 2 approximating a parabola which has a specific coefficient b can be designed. In other words, a preferable design condition of the cutting edge 2 is to design the cutting edge 2 which has at least three different point angles and of which respective positions of the both ends of ridgelines forming the point angles are on a single parabola or plural parabolas.

Two parabolas which are line-symmetric about the tool axis Tax sometimes can be considered as a curve locally similar to a single parabola which is symmetric about the tool axis Tax. Thus, a shape of the cutting edge 2 can also be designed so that a line-symmetric and discontinuous line along two parabolas instead of a single parabola is drawn on a projection plane.

Figure 3:
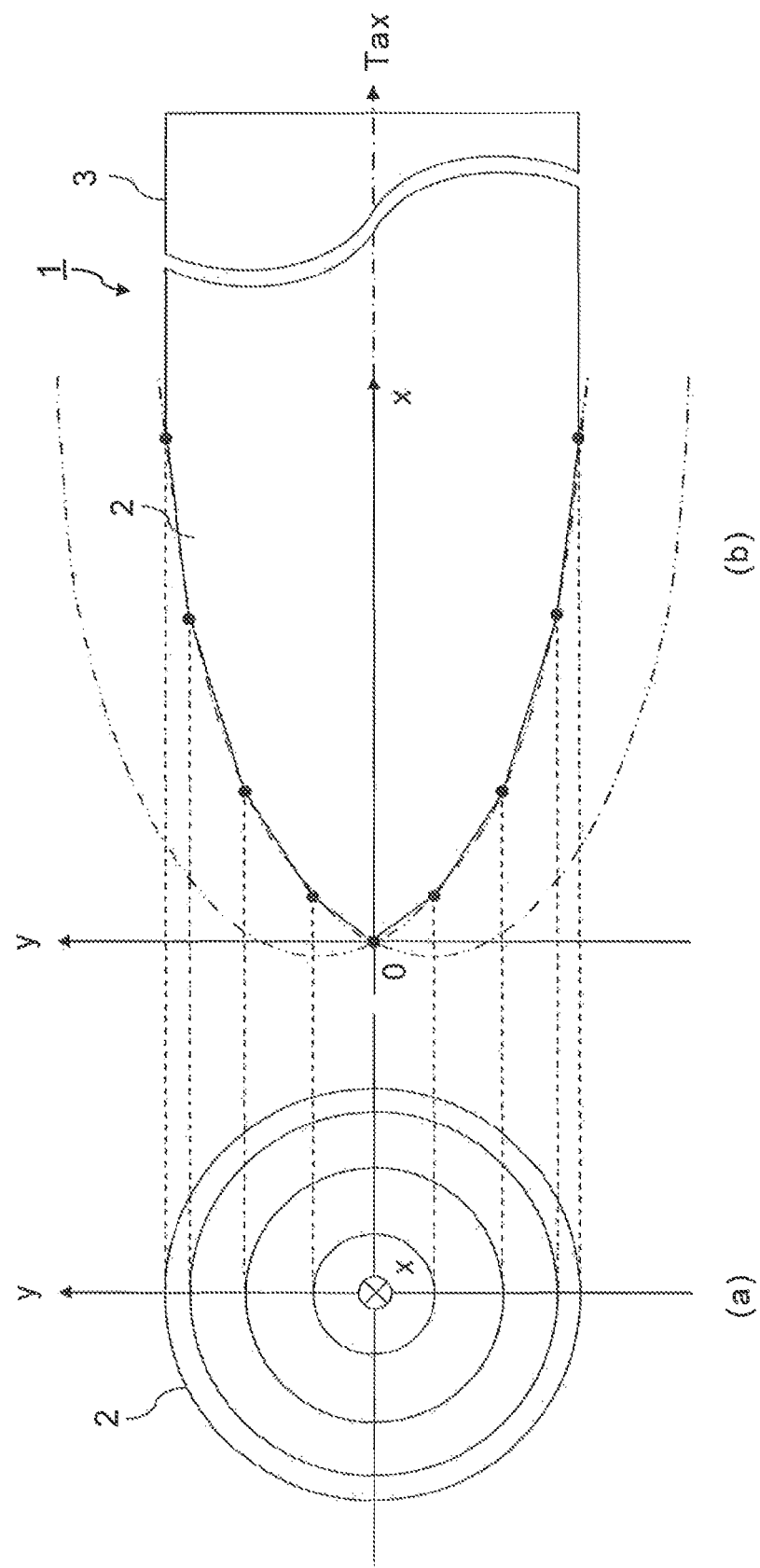
FIG. 3 is a view showing an example of designing a shape of each cutting edge of the drill so that the cutting edges are along two parabolas.

FIG. 3 is a view showing an example of designing a shape of each cutting edge 2 of the drill 1 so that the cutting edges 2 are along two parabolas.

As shown in FIG. 3, a shape of each cutting edge 2 of the drill 1 can also be designed along two parabolas which are line-symmetric about the tool axis Tax.

Next, a method of manufacturing the drill 1 will be described.

The drill 1 can be manufactured by an arbitrary method. Specific examples include a method for sintering a powder, besides machining by cutting or grinding. This is not only limited to a case of manufacturing the solid type drill 1 which forms the cutting edges 2 on the shank 3 but also a case of manufacturing the cutting edges 2 as tips.

Specifically, in order to manufacture the drill 1, a process to set a material of the drill 1 is performed first. Next, a process to form the cutting edges 2 is performed using the set material so that a line-symmetric and discontinuous line along a single or two parabolas or ellipses is drawn on a projection plane parallel to the tool axis Tax when a passing area of the ridgelines rotating around the tool axis Tax is projected on the projection plane.

For example, when the solid type drill 1 is manufactured by machining, a bar-shaped material is set in a drill processing machine. Then, the cutting edges 2 each having a structure as mentioned above are formed by cutting or grinding the bar-shaped material.

Meanwhile, when the drill 1 is manufactured by a sintering method, powder, such as carbide material, is set as a material in a mold corresponding to a shape and a structure of the cutting edges 2. Then, the cutting edges 2 are formed by a sinter of the powder.

That is, the drill 1 as described above is a polygonal drill having one or plural discontinuous ridgelines along a parabola, parabolas, an ellipse or ellipses.

Therefore, according to the drill 1, a volume of a workpiece which is cut by each part of each cutting edge 2 can be made uniform. Consequently, cutting resistance in a direction along each cutting edge 2 can be made uniform.

When the cutting resistance becomes uniform, effects of reducing generation of burrs in addition to reducing significant delamination can be obtained in processing of composite materials. Therefore, a satisfactory worked surface can be formed on a workpiece. Meanwhile, the life of the drill 1 can be improved by reducing abrasion of the drill 1.

Furthermore, a shape of each cutting edge 2 of the drill 1 is simple compared to a case where a shape of each ridgeline on a projection plane is designed to be a free curve, such as a continuous parabola, whose curvature is not constant. Therefore, manufacturing the drill 1 becomes easier than the conventional method.

For example, when a shape of each cutting edge 2 of the drill 1 is designed so that a discontinuous line connecting curves discontinuously is drawn on a projection plane, the drill 1 can be manufactured by repeating curve processing or curved surface processing for a specific curvature which is easy to be manufactured. That is, a range to change the curvature continuously can be limited in curve processing or curved surface processing.

Alternatively, when a shape of each cutting edge 2 of the drill 1 is designed so that a polygonal line connecting linear line segments discontinuously is drawn on a projection plane, manufacturing costs of the drill 1 can be further reduced. For example, when each cutting edge 2 is formed by cutting or grinding it, it is not necessarily required to change a direction of a cutting tool or a grinding tool continuously. Alternatively, even when each cutting edge 2 is formed by a sintering method, a structure of a mold becomes simple, thereby manufacturing costs can be reduced.

Especially, in recent years, the cutting edges 2 or a mold corresponding to a shape of the cutting edges 2 can be processed with an extremely minute pitch. Therefore, an approximation accuracy to a parabola, parabolas, an ellipse or ellipses can be improved by forming many point angles. Thereby, high-accuracy drilling and improving the life of the drill 1 can be achieved with avoiding an increase in manufacturing costs of the drill 1.

(Second Implementation)

Figure 4:
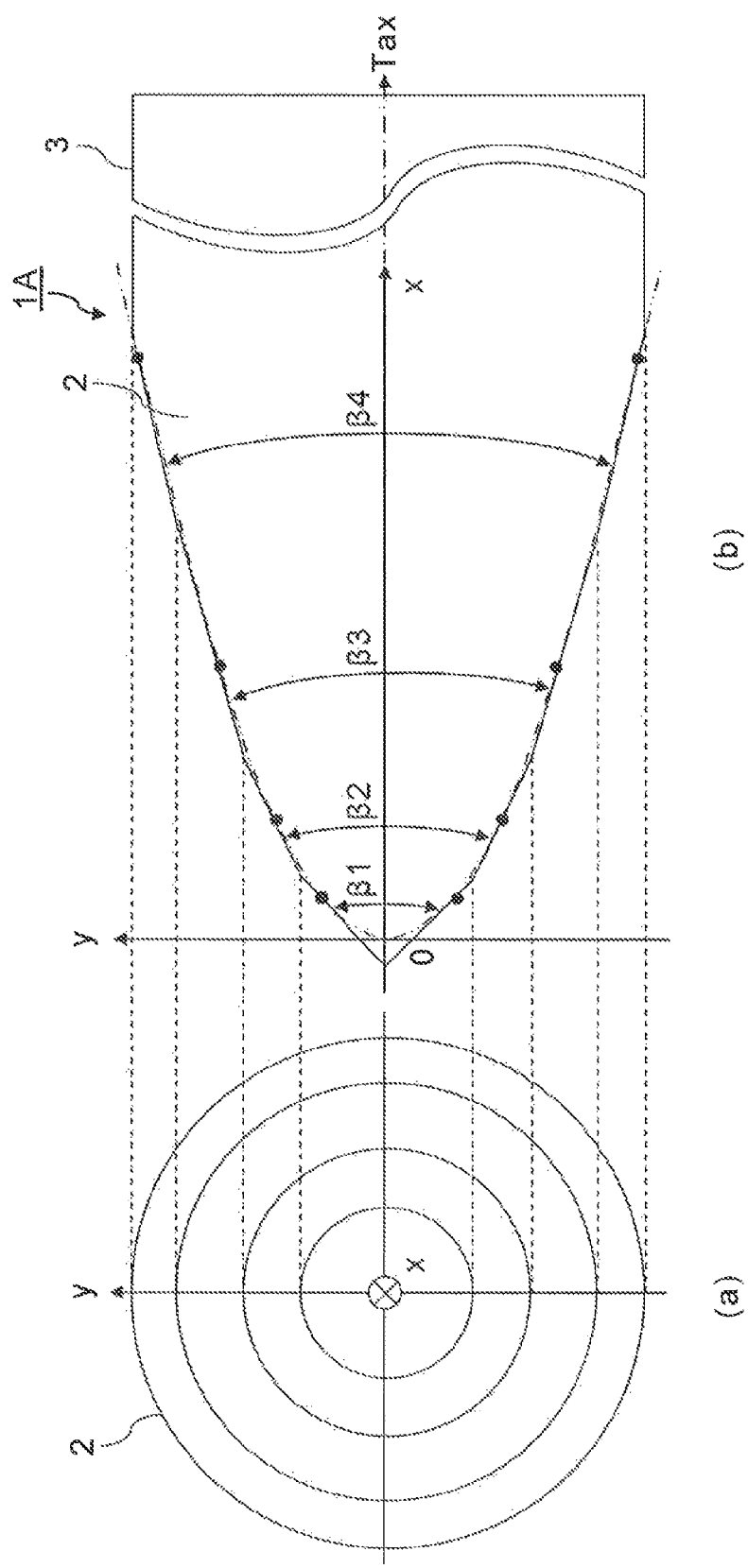
FIG. 4 shows a shape of a drill according to the second implementation of the present invention.

FIG. 4 shows a shape of a drill according to the second implementation of the present invention.

A drill 1A in the second implementation shown in FIG. 4 differs from the drill 1 in the first implementation in approximation method for designing ridgelines of the cutting edges 2. Other configurations and functions of the drill 1A in the second implementation are substantially similar to those of the drill 1 in the first implementation. Therefore, the same or corresponding elements of the drill 1A in the second implementation are shown by the same signs, and explanations for common matters are omitted.

(a) of FIG. 4 is a projected view of a passing area of ridgelines of the cutting edges 2, on a projection plane perpendicular to a tool axis Tax when the cutting edges 2 are rotated around the tool axis Tax. Meanwhile, (b) of FIG. 4 is a projected view of the passing area of the ridgelines of the cutting edges 2, on a projection plane parallel to the tool axis Tax when the cutting edges 2 are rotated around the tool axis Tax.

The first implementation shows a case where a parabola or an ellipse is approximated by connecting line segments so that positions of the both ends of each line segment are on the parabola or the ellipse. Alternatively, a parabola or an ellipse may be approximated by connecting line segments tangent to the parabola or the ellipse as shown in FIG. 4.

When a shape of the cutting edges 2 is designed by a straight-line approximation of a parabola, the cutting edges 2 have a shape such that a line-symmetric polygonal line discontinuously connecting at least eight linear line segments, each of which is tangent to the parabola, is drawn as a discontinuous line on a projection plane, as shown in FIG. 4. In other words, one or plural cutting edges 2 which have at least four different point angles and of which the ridgelines forming the point angles are tangent to a single or plural parabolas are to be designed. Note that, the drill 1A which has four different point angles $\beta 1$, $\beta 2$, $\beta 3$ and $\beta 4$ is shown in FIG. 4.

The above mentioned drill 1A in the second implementation can also obtain effects similar to those of the drill 1 in the first implementation.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A drill, comprising:
   a shank and a cutting edge, the cutting edge including a fixed end coupled to the shank, a free end opposite to the fixed end, and a surface on which ridgelines are provided,
   wherein a projected shape of a passing area of the ridgelines of said cutting edge, when said cutting edge is rotated around a tool axis, becomes a line-symmetric and discontinuous line along a parabola, two parabolas, an ellipse, or two ellipses,
   wherein the projected shape is drawn on a projection plane parallel to the tool axis,
   wherein the line-symmetric and discontinuous line comprises a first symmetrical half on a first side of the tool axis and a second symmetrical half on a second side of the tool axis, each of the first and second symmetrical halves comprising at least three discontinuous points that discontinuously connect continuous line portions, the continuous line portions being linear line segments or continuous curves, and
   wherein the at least three discontinuous points of at least one of the first and second symmetrical halves of the line-symmetric and discontinuous line each reside along a common parabola or ellipse that extends convexly from the fixed end of the cutting edge to a vertex located nearer the free end of the cutting edge.

2. A drill of claim 1,
   wherein the projected shape becomes a line-symmetric polygonal line connecting linear line segments discontinuously.

3. A drill of claim 2,
   wherein the projected shape becomes a line-symmetric polygonal line discontinuously connecting at least six linear line segments, positions of both ends of each of the line segments being on the parabola, the two parabolas, the ellipse, or the two ellipses.

4. A drill of claim 2,
   wherein the projected shape becomes a line-symmetric polygonal line discontinuously connecting at least eight linear line segments each tangent to the parabola, the two parabolas, the ellipse, or the two ellipses.

5. A drill of claim 1,
wherein the projected shape becomes a line-symmetric curve connecting continuous curves discontinuously.

6. A drill of claim 1,
wherein the at least three discontinuous points along the first symmetrical half of the line-symmetric and discontinuous line and the at least three discontinuous points along the second symmetrical half of the line-symmetric and discontinuous line each reside along a common parabola or ellipse.

7. A drill of claim 6,
wherein the tool axis of the drill coincides with a major axis of the common parabola or ellipse.

8. A drill of claim 6,
wherein a tip point of the drill resides along the common parabola or ellipse.

9. A drill of claim 1,
wherein the at least three discontinuous points along the first symmetrical half of the line-symmetric and discontinuous line reside along a first common parabola or ellipse, and
wherein the at least three discontinuous points along the second symmetrical half of the line-symmetric and discontinuous line reside along a second common parabola or ellipse.

10. A drill of claim 9,
wherein the first common parabola or ellipse and the second common parabola or ellipse are line-symmetric with one another.

11. A drill of claim 9,
wherein a tip point of the drill resides along both the first common parabola or ellipse and the second common parabola or ellipse.

12. A drill having:
a cutting edge including a surface on which ridgelines are provided; and
at least three different point angles defined by three pairs of ridgelines,
wherein the three pairs of ridgelines consist of ridgelines that have ends on a common parabola.

13. A drill having:
a cutting edge including a surface on which ridgelines are provided; and
at least four different point angles defined by four pairs of ridgelines,
wherein the four pairs of ridgelines consist of ridgelines that are tangent to a common parabola.

14. A method of manufacturing a drill,
the drill comprising a shank and a cutting edge, the cutting edge including a fixed end coupled to the shank, a free end opposite to the fixed end, and a surface on which ridgelines are provided,
the method comprising:
setting a material of the drill; and
forming said cutting edge using the material,
wherein a projected shape of a passing area of the ridgelines of said cutting edge, when said cutting edge is rotated around a tool axis, becomes a line-symmetric and discontinuous line along a parabola, two parabolas, an ellipse, or two ellipses,
wherein the projected shape is drawn on a projection plane parallel to the tool axis,
wherein the line-symmetric and discontinuous line comprises a first symmetrical half on a first side of the tool axis and a second symmetrical half on a second side of the tool axis, each of the first and second symmetrical halves comprising at least three discontinuous points that discontinuously connect continuous line portions, the continuous line portions being linear line segments or continuous curves, and
wherein the at least three discontinuous points of at least one of the first and second symmetrical halves of the line-symmetric and discontinuous line each reside along a common parabola or ellipse that extends convexly from the fixed end of the cutting edge to a vertex located nearer the free end of the cutting edge.

15. A method of manufacturing a drill of claim 14,
wherein a powder as the material is set in a mold corresponding to said cutting edge, and
said cutting edge is formed by a sinter of the powder.

16. A method of manufacturing a drill of claim 14,
wherein a bar-shaped material is set, and
said cutting edge is formed by cutting or grinding the bar-shaped material.

17. A drill having at least one cutting edge,
wherein a projected shape of a passing area of a ridgeline of said at least one cutting edge, when said at least one cutting edge is rotated around a tool axis, becomes a line-symmetric and discontinuous line along two parabolas or two ellipses,
wherein the projected shape is drawn on a projection plane parallel to the tool axis,
wherein the line-symmetric and discontinuous line comprises a first symmetrical half on a first side of the tool axis and a second symmetrical half on a second side of the tool axis,
wherein at least three points along the first symmetrical half of the line-symmetric and discontinuous line reside along a first common parabola or ellipse,
wherein at least three points along the second symmetrical half of the line-symmetric and discontinuous line reside along a second common parabola or ellipse, and
wherein the tool axis does not coincide with a major axis of either the first common parabola or ellipse or the second common parabola or ellipse.

* * * * *